(12) United States Patent
Han

(10) Patent No.: US 7,246,362 B2
(45) Date of Patent: Jul. 17, 2007

(54) OPTICAL DISK DRIVE ALLOWING FOR HORIZONTAL OR VERTICAL INSTALLATION

(75) Inventor: Tae-gon Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 380 days.

(21) Appl. No.: 10/872,544

(22) Filed: Jun. 22, 2004

(65) Prior Publication Data

US 2005/0015784 A1    Jan. 20, 2005

(30) Foreign Application Priority Data

Jul. 16, 2003    (KR)    ...................... 10-2003-0048653

(51) Int. Cl.
G11B 17/028    (2006.01)
G11B 17/04    (2006.01)

(52) U.S. Cl. ..................................... 720/603

(58) Field of Classification Search ................ 720/601, 720/603–304, 615–616, 706, 710–712, 714
See application file for complete search history.

(56) References Cited

U.S. PATENT DOCUMENTS 6,529,468 B2 *    3/2003    Noda et al. .................. 720/710

2002/0031058 A1 *    3/2002    Ahn et al. ................ 369/30.36
2002/0114254 A1 *    8/2002    Ohgaki ........................ 720/616
2003/0133389 A1 *    7/2003    Wang .......................... 720/603
2005/0010942 A1 *    1/2005    Kim et al. ................... 720/706

FOREIGN PATENT DOCUMENTS

| JP | 8-124264 | 5/1996 |
| KR | 2000-21126 | 4/2000 |

* cited by examiner

*Primary Examiner*—Wayne Young
*Assistant Examiner*—Nathan Danielsen
(74) *Attorney, Agent, or Firm*—Staas & Halsey LLP

(57) ABSTRACT

An optical disk drive includes: a tray having first and second loading portions for respectively loading a first disk and a second disk of a smaller diameter than the first disk, the first and second loading portions having different heights, first and second inclined portions formed obliquely outward and inward on edges of the first and second loading portions, respectively. The optical disk drive further includes: a spindle motor having a turntable supporting the disks on a plane thereof, the motor rotating the disks and approaching/departing from the disks; and a clamp rotatably supporting the disks on the other plane thereof, wherein the clamp can approach the disks due to a magnetic force exerted between the clamp and the turntable as the spindle motor approaches the disks.

15 Claims, 13 Drawing Sheets

OPTICAL DISK DRIVE ALLOWING FOR HORIZONTAL OR VERTICAL INSTALLATION

CROSS-REFERENCE TO RELATED APPLICATION

This application claims the priority of Korean Patent Application No. 2003-48653, filed on Jul. 16, 2003, in the Korean Intellectual Property Office, the disclosure of which is incorporated herein by reference.

BACKGROUND OF THE INVENTION

1. Field of the Invention

The present invention relates to an optical disk drive and, more particularly, to an optical disk drive which can be installed horizontally or vertically.

2. Description of the Related Art

An optical disk drive is a device for writing or reading information by irradiating light onto a disk-shaped optical medium (hereinafter called a disk) such as a compact disk (CD) or a digital video disk (DVD).

FIG. 1 is a plan view of one example of a conventional optical disk drive and FIG. 2 is a schematic sectional view of the conventional optical disk drive of FIG. 1 taken along line I–I'.

Referring to FIGS. 1 and 2, a tray 20 is slidably installed in a frame 10. The frame 10 includes a spindle motor 31 for rotating a disk 50, and a deck 30 having an optical pickup 32 for accessing the disk while sliding above the disk. The deck 30 is installed under the tray 20 and is able to ascend or descend. A loading motor 13 for loading or unloading the tray 20 is also installed in the frame 10. A cover 40 with a clamp 41 is provided above the frame 10.

When the disk 50 is mounted on a first loading surface 21 of the tray 20 and then the loading motor 13 is rotated, the tray 20 slides in the direction A shown in FIG. 1. When the loading of the tray 20 is completed, the deck 30 is lifted. A bottom 51 of the disk 50 comes into contact with a turntable 34 on the rotation shaft of the spindle motor 31, and the disk 50 is lifted with the deck 30. When the clamp 41 makes contact with a top surface 52 of the disk 50, the turntable 34 and the clamp 41 support the disk 50. Here, the disk 50 is slightly moved upward from the first loading surface 21, as shown in FIG. 2. In this situation, as the spindle motor 31 rotates the disk 50, the optical pickup 32 slides in a radial direction of the disk 50 and accesses the disk 50 so as to write and/or read information. The procedure of unloading the disk 50 is carried out in the reverse order of its loading.

The optical disk drive is usually installed horizontally as shown in FIG. 1. However, recently, the optical disk dive is frequently installed vertically as shown in FIG. 3. If the optical disk drive is vertically installed, a catch 23 extending slightly upward from the first loading surface 21 is provided as also shown in FIGS. 1 and 2, to prevent the disk 50 from falling or separating from the first loading surface 21 after being loaded. Since the disk 50 contacts only the turntable 34 in the ascending section (D1 of FIG. 2) from the moment when the bottom 51 of the disk 50 comes into contact with the turntable 34 to the moment when the top surface 52 of the disk 50 comes into contact with the clamp 41, the disk 50 may be possibly detached from the turntable 34 when vertically installed.

Usually, the disk 50 has a diameter of 120 mm. However, recently a disk 60 with a diameter of 80 mm has been largely used. As shown in FIG. 4, in order to load the disk 60, the tray 20 has a second loading surface 22 lower than the first loading surface 21. When the disk 60 is loaded in a vertically installed optical disk drive, the disk 60 may fall or separate from the second loading surface 22 during loading of the tray 20. Since the second loading surface 22 is lower than the first loading surface 21, the ascending section D2, from the moment when a bottom 61 of the disk 60 contacts the turntable 34 to the moment when a top surface 62 of the disk 60 comes into contact with the clamp 41, is longer than the ascending section D1 of the disk 50 having a diameter of 120 mm. For this reason, it is highly possible that the disk 60 separates from the turntable 34 before coming into contact with the clamp 41.

SUMMARY OF THE INVENTION

The present invention provides an optical disk drive into which a disk can be stably loaded even when the optical disk drive is installed vertically. Furthermore, the present invention provides an optical disk drive into which two disks having different diameters can be stably loaded even when the optical disk drive is installed vertically.

According to an aspect of the present invention, there is provided an optical disk drive having a tray including first and second loading portions for respectively loading a first disk and a second disk of a smaller diameter than the first disk, the first and second loading portions having different heights, first and second inclined portions formed obliquely outward and inward on edges of the first and second loading portions, respectively, and a separation preventing portion extending over the first loading portion to prevent the first disk from departing from the first loading portion; a spindle motor having a turntable supporting the disks on one plane thereof and rotating the disks and approaching/departing from the disks; and a clamp rotatably supporting the disks on the other plane thereof, wherein the clamp can approach the disks due to a magnetic force exerted between the clamp and the turntable as the spindle motor approaches the disks.

The clamp may include: a first member; a second member installed in the first member and approaching the disks due to the magnetic force exerted between the clamp and the turntable; and an elastic member elastically-biasing the first member in a direction in which the second member is detached from the disks.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
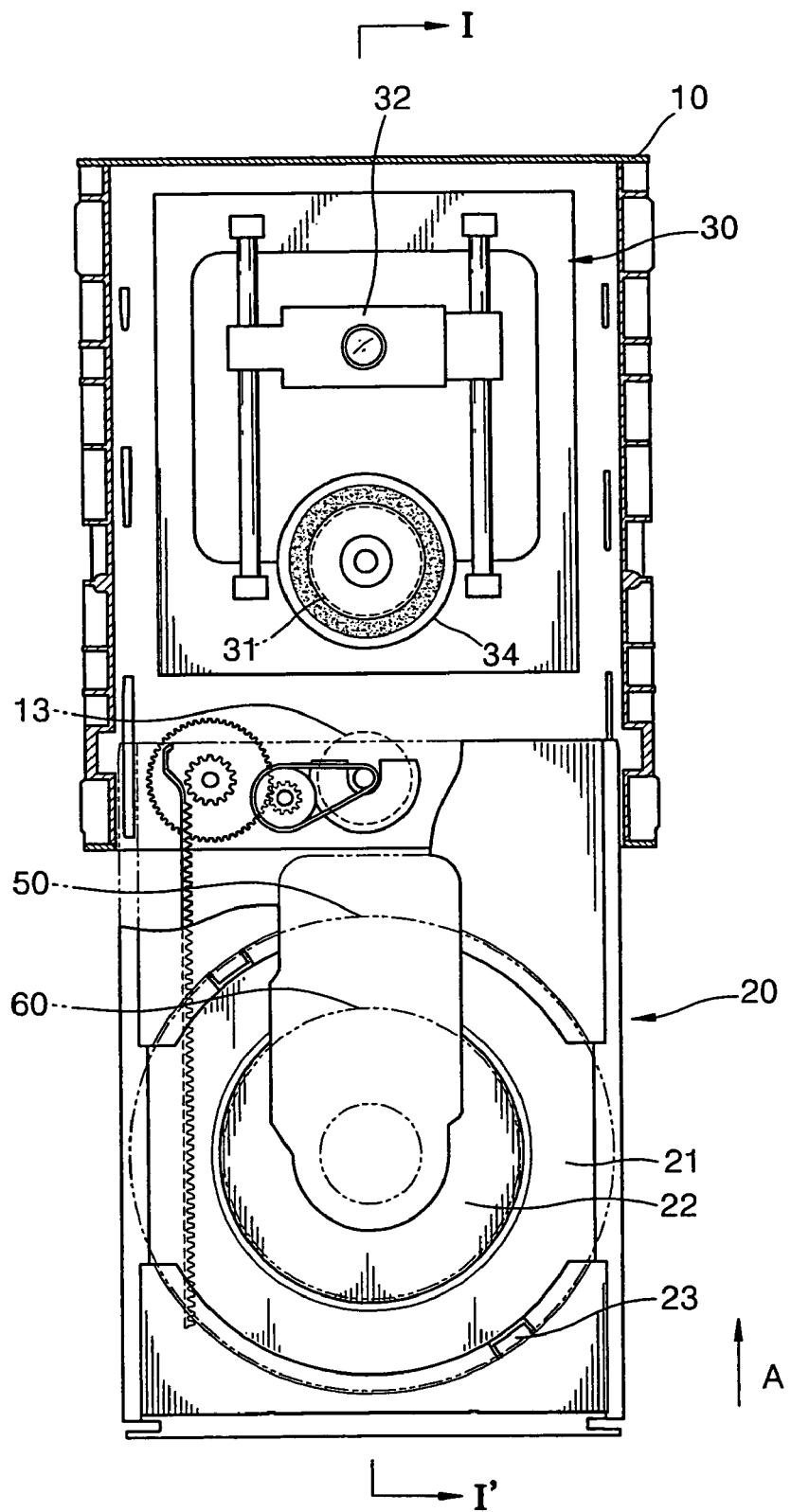
FIG. 1 is a schematic plan view of an example of a conventional optical disk drive.
Figure 2:
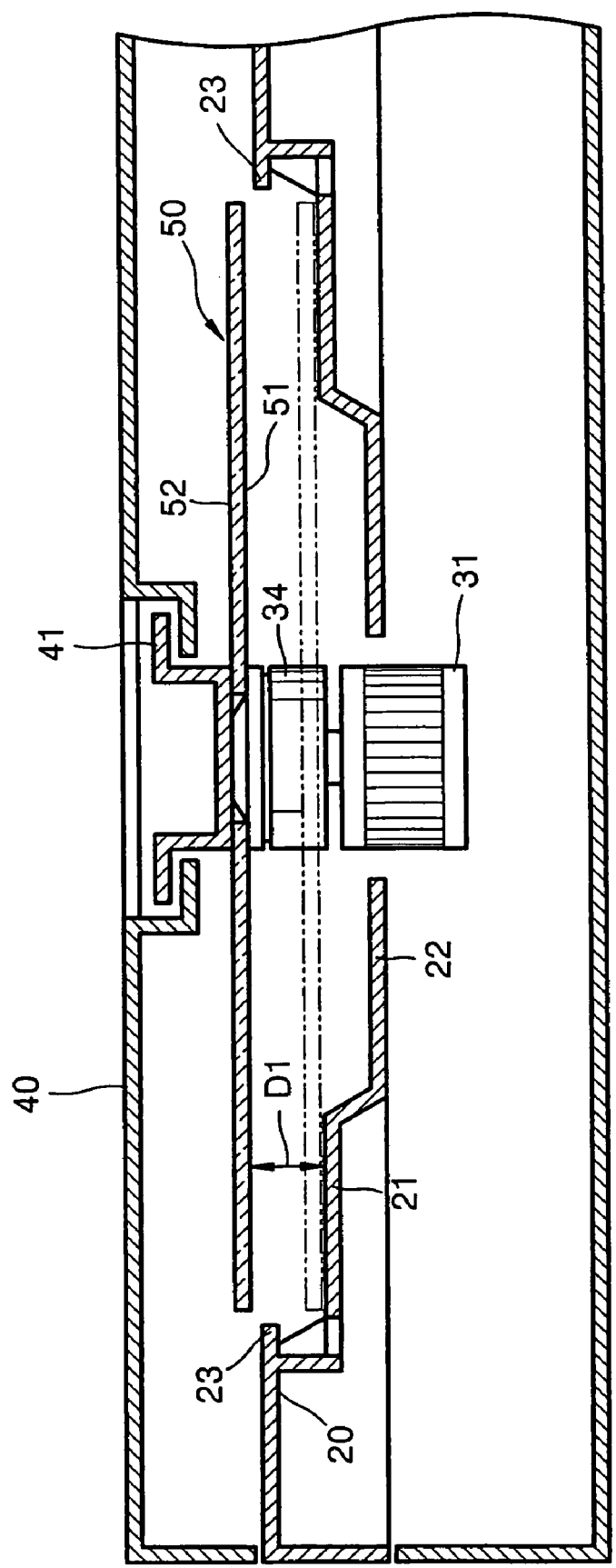
FIG. 2 is a sectional view the conventional optical disk drive of FIG. 1 taken along line I–I'.
Figure 3:
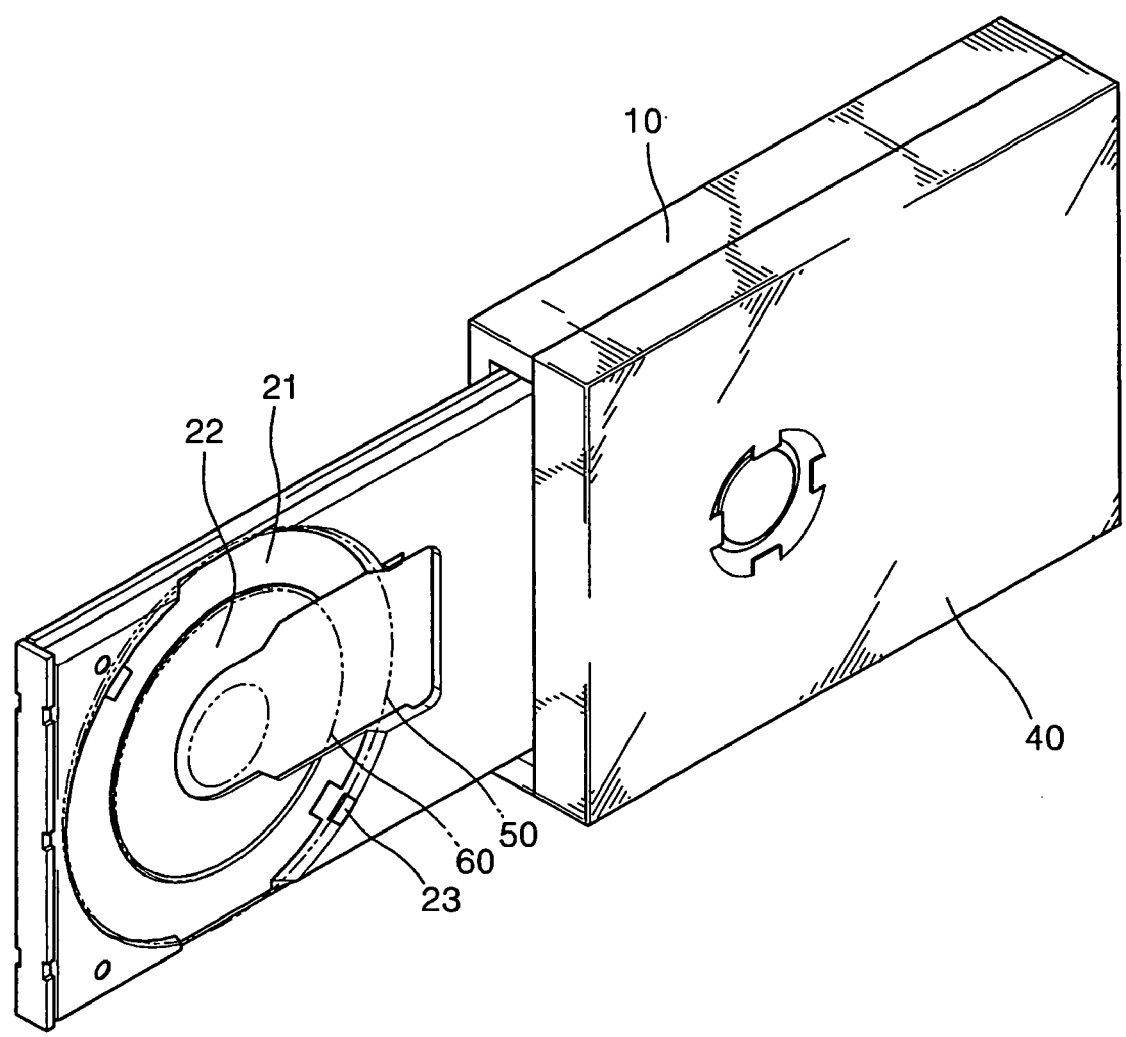
FIG. 3 is a perspective view of the conventional optical disk drive installed vertically.
Figure 4:
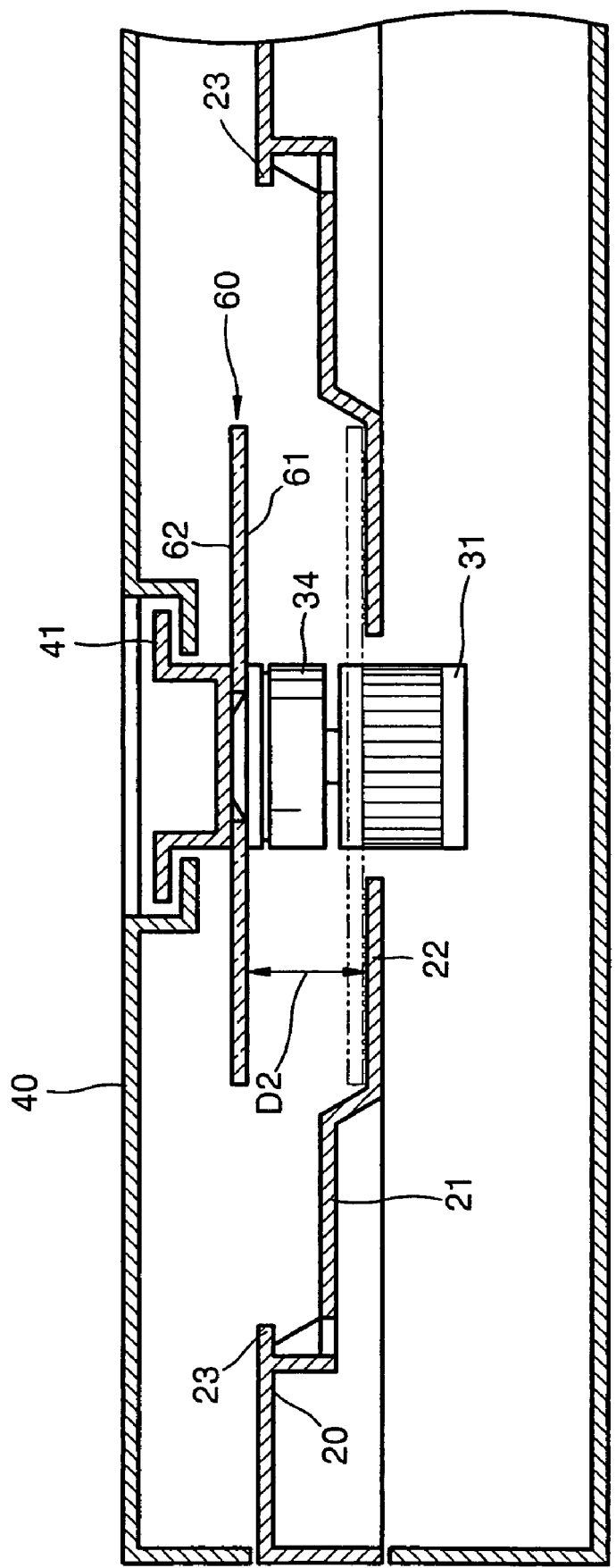
FIG. 4 is a sectional view of a case where an 80 mm disk is loaded into the optical disk drive shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
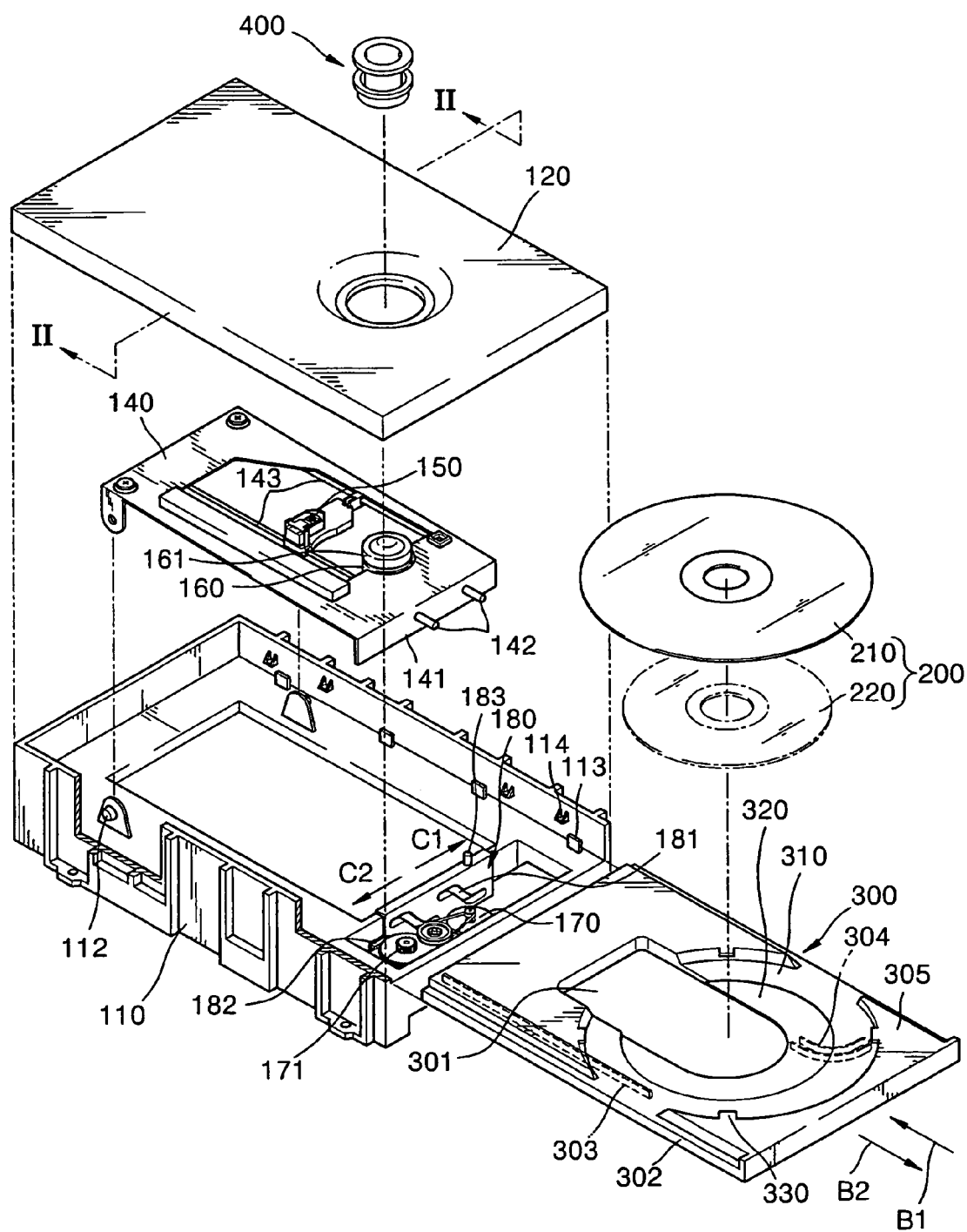
FIG. 5 is an exploded perspective view of an embodiment of an optical disk drive according to an embodiment of the present invention.

Referring to FIG. 5, an optical disk drive according to an embodiment of the present invention includes a first frame 110, a second frame 120 facing the first frame 110, and a tray 300. The optical disk drive further includes an optical pickup 150 for writing and/or reading information while accessing a disk 200, and a spindle motor 160 for rotating the disk 200. Reference numeral 170 indicates a loading motor for loading/unloading the tray 300. Reference numeral 171 indicates a pinion rotated by the loading motor 170, and reference numeral 400 indicates a clamp.

The loading motor 170 and the pinion 171 are installed in the first frame10. A cam member 180 is slidably installed in the first frame 110 in directions C1 and C2. The cam member 180 has a pair of first cam grooves 181, and a first rack gear 182 selectively connected to the pinion 171. A boss 183 is formed in the cam member 180.

A deck 140 is installed in the first frame 110. The spindle motor 160 and the optical pickup 150 are installed in the deck 140. A turntable 161, on which the disk 200 is placed, is coupled to the spindle motor 160. A magnet (not shown) is provided in the turntable 161. The turntable 161 may be formed wholly or partly of a magnetic material. The optical pickup 150 is installed to be able to slide along a guide shaft 143. The deck 140 is coupled rotatably to a pivot 112 placed in the first frame 110. Two shafts 142 are provided in the front 141 of the deck 140. The two shafts 142 are inserted into the first cam groove 181.

The tray 300 is installed slidably in the first frame 110. A plurality of guide members 113 and 114 are positioned on both or each of the sides of the first frame 110. The guide members 113 and 114 are spaced vertically so as to allow the tray 300 to slide. A hollow window 301 is formed in the tray 300 so that the optical pickup 150 is able to access the disk 200. A rail 302, interposed between the guide members 113 and 114, is formed on both sides of the tray 300. As indicated by dotted lines in FIG. 5, on the bottom of the tray 300 are provided a second rack gear 303 connected to the pinion 171 and a second cam groove 304 interfering with the boss 183 of the cam member 180 when the tray 300 is loaded.

The tray 300 has a first loading portion 310 for the first disk 210 and a second loading portion 320 for the second disk 220. In this embodiment, the first disk 210 is a 120 mm-diameter disk, and the second disk 220 is a 80 mm-diameter disk. The second loading portion 320 is formed lower than the first loading portion 310.

Figure 6:
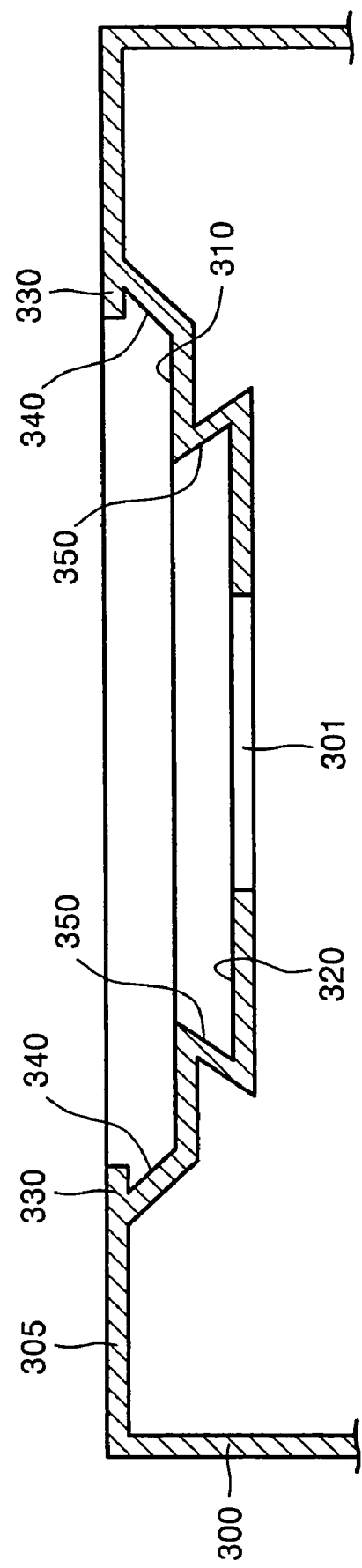
FIG. 6 is a schematic sectional view of a tray shown in FIG. 5.

Referring to FIG. 6, the first and second inclined portions 340 and 350 are tilted outside and inside, respectively, and are formed on the edges of the first and second loading portions 310 and 320. The first inclined portion 340 extends to the top surface 305 of the tray 300 from the first loading portion 310, while the second inclined portion 350 extends from the second loading portion 320 to the first loading portion 310. When the optical disk drive is installed vertically, a single or multiple separation preventing portions 330 may be formed in the tray 300 so that the first disk 210 is prevented from falling or separating from the first loading portion 310. The separation preventing portion or portions 330 may be formed to extend slightly over the first loading portion 310 from the top surface 305 of the tray 300. The separation preventing portion or portions 330, as shown in FIG. 5, are desirably presented in at least four symmetrical places at the reference of the direction where the tray 300 slides. The clamp 400 is installed movably in the second frame 120.

Figure 7:
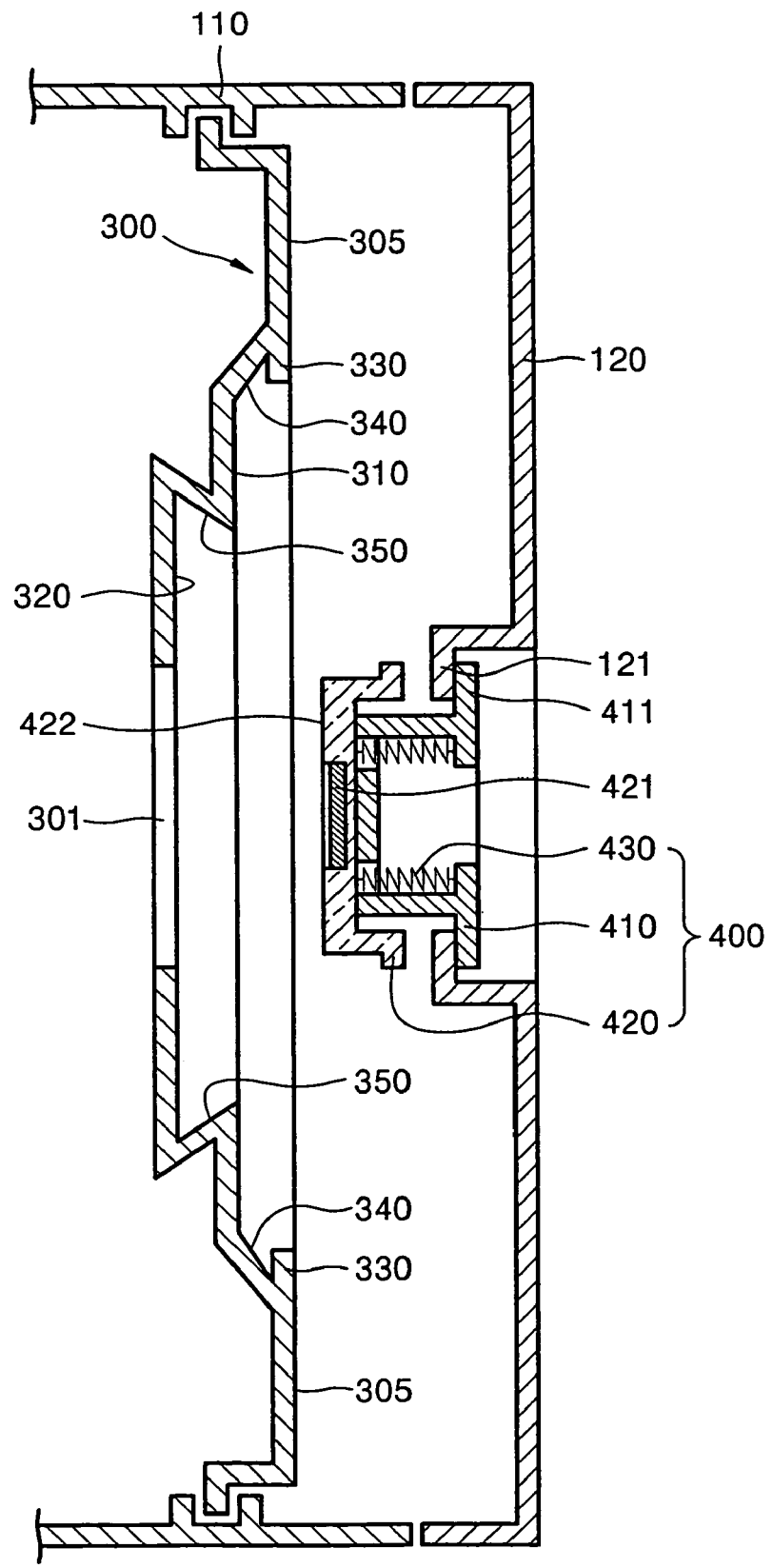
FIG. 7 is a sectional view of the optical disk drive of FIG. 5 taken along line II–II'.

Turning to FIG. 7, the clamp 400, according to an embodiment of the present invention, includes a first member 410, a second member 420, and an elastic member 430. The elastic member 430 elastically connects the first and second members 410 and 420 with each other. The second member 420 is configured to support the top surface of the disk 200, while facing the turntable 161. An iron piece 421 is provided in the second member 420 so as to attract the magnet (not shown) placed in the turntable 161. The elastic member 430 makes the second member 420 elastically bias in the opposite direction to that of the magnetic force exerted between the turntable 161 and the second member 420 with respect to the first member 410. In this embodiment, a tensile coil spring is used as the elastic member 430, as shown in FIG. 7.

The clamp 400 is installed movably with respect to the second frame 120 by the edge 411 of the first member 410 put on a support 121 of the second frame 120. In order not to cause the tray 300 to interfere with the second member 420 when the tray 300 is loaded or unloaded, the bottom of the second member 420 is desirably placed slightly over the top surface 305 of the tray 300. The clamp 400 shown in FIG. 7 may have various forms.

Hereinafter the procedure of loading the first and second disks 210 and 220 into a vertically installed optical disk drive will be described.

First, the procedure of loading the first disk 210 will be explained. As shown in FIG. 5, the first disk 210 is mounted on the first loading portion 310. When the loading motor 170 rotates, the pinion 171 connected to the second rack gear 303 is rotated. The tray 300 slides in the direction B1 shown in FIG. 5. Here, the cam member 180 does not move because the first rack gear 182 is detached from the pinion 171. The tray 300 continues to slide so that the boss 183 of the cam member 180 is inserted into the second cam groove 304 placed in the tray 300. From this moment, the cam member 180 moves in the direction C1 of FIG. 5 due to the interference between the second cam groove 304 and the boss 183, and the first rack gear 182 is connected to the pinion 171. When the tray 300 is completely loaded, the connection between the pinion 171 and the second rack gear 304 is finished so that the tray 300 stops sliding.

Figure 8A:
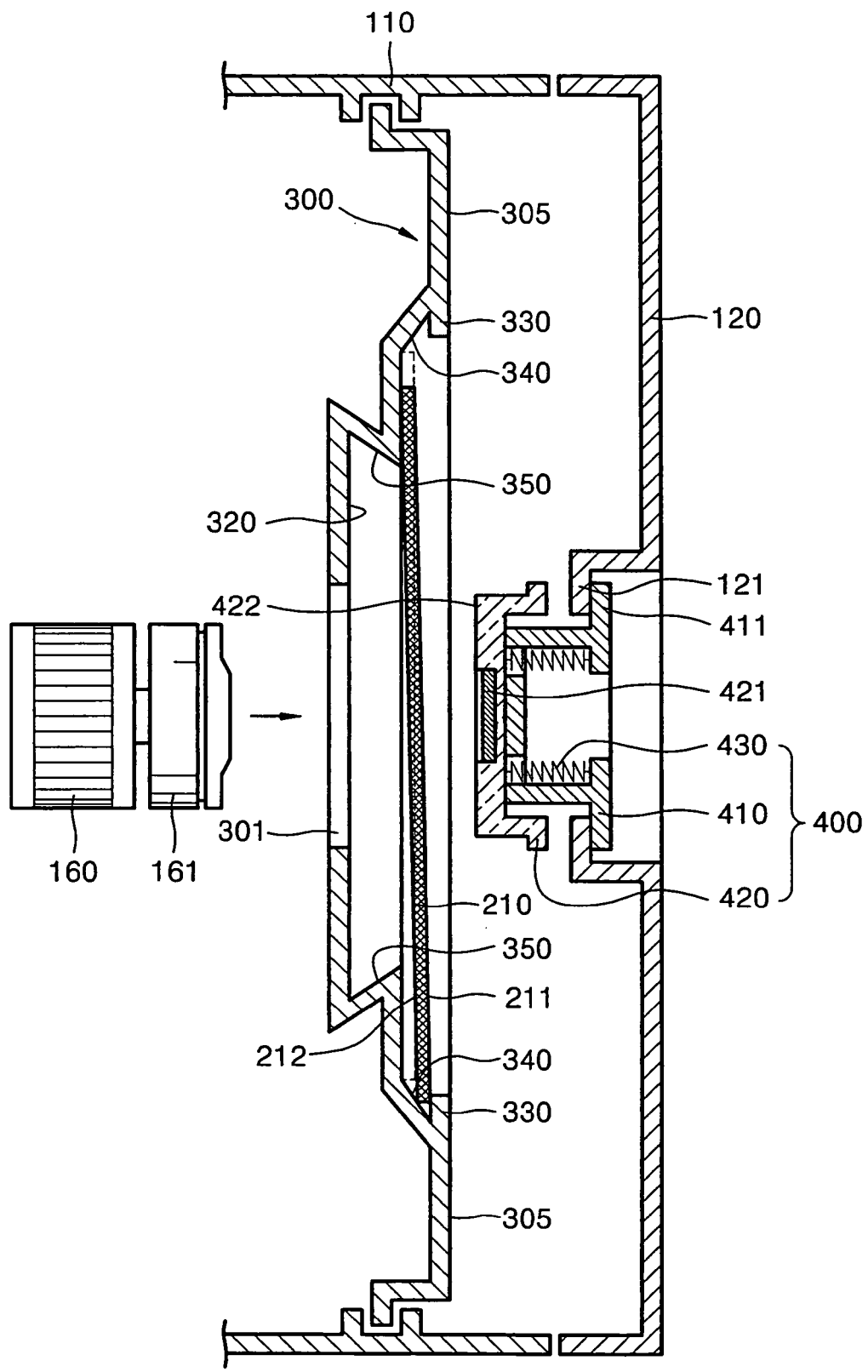
FIGS. 8A, 8B, and 8C are sectional views for explaining a loading procedure of a first disk.

When the optical disk drive is vertically installed, it is more likely that the first disk 210 slides down to a position indicated by solid lines from a position indicated by dashed lines in FIG. 8A so that the first disk 210 stands obliquely and is hooked by the separation preventing portion 330. As a result, the first disk 210 does not separate from the first loading portion 310 due to the separation preventing portion 330.

When the loading motor 170 rotates, the cam member 180 slides in the direction C1 of FIG. 5, and the deck 140 turns on the pivot 112 due to the interference between the shaft 142 and the first cam groove 181. Therefore, the spindle motor 160 moves toward the first disk 210.

Figure 8B:
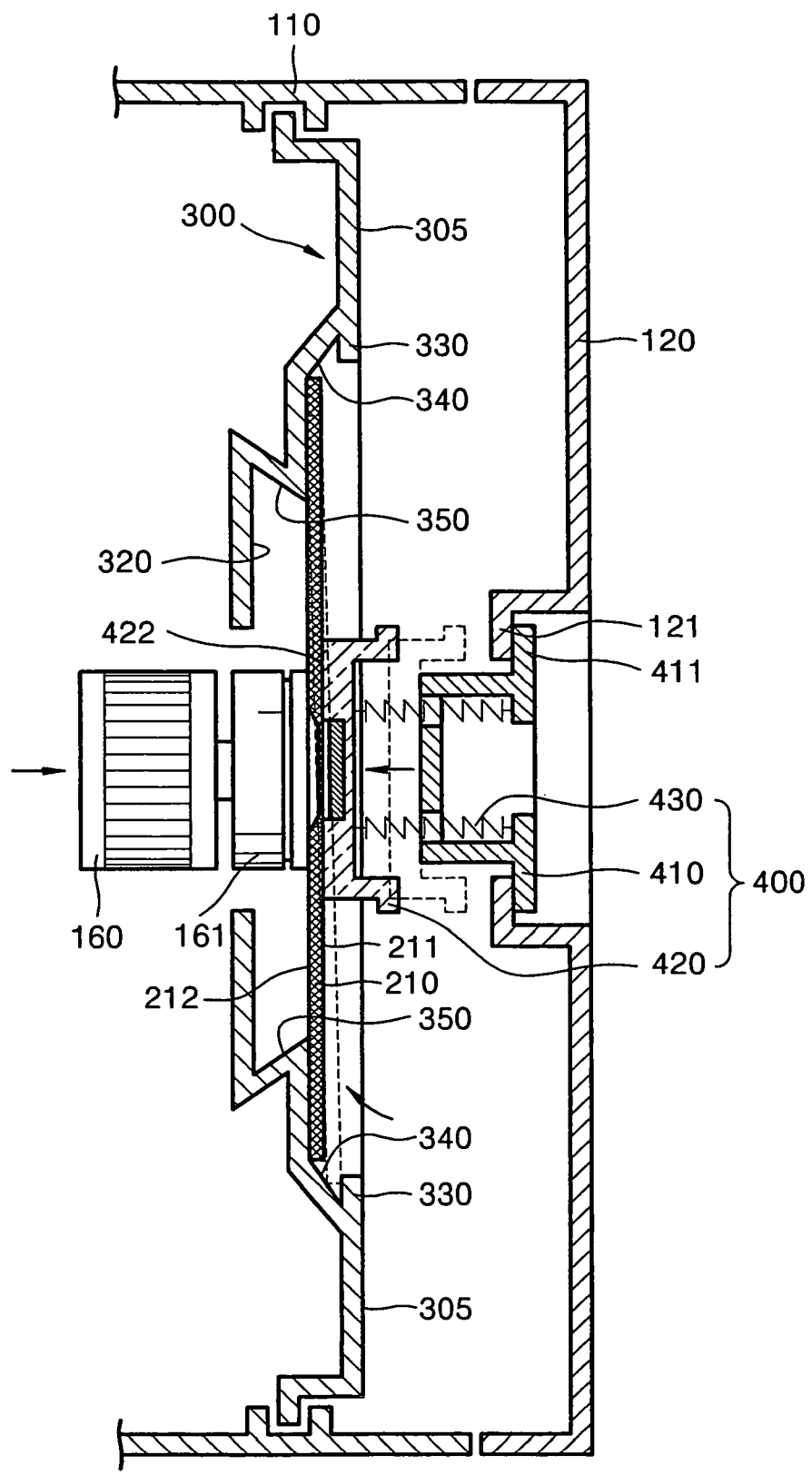
Figure 8C:
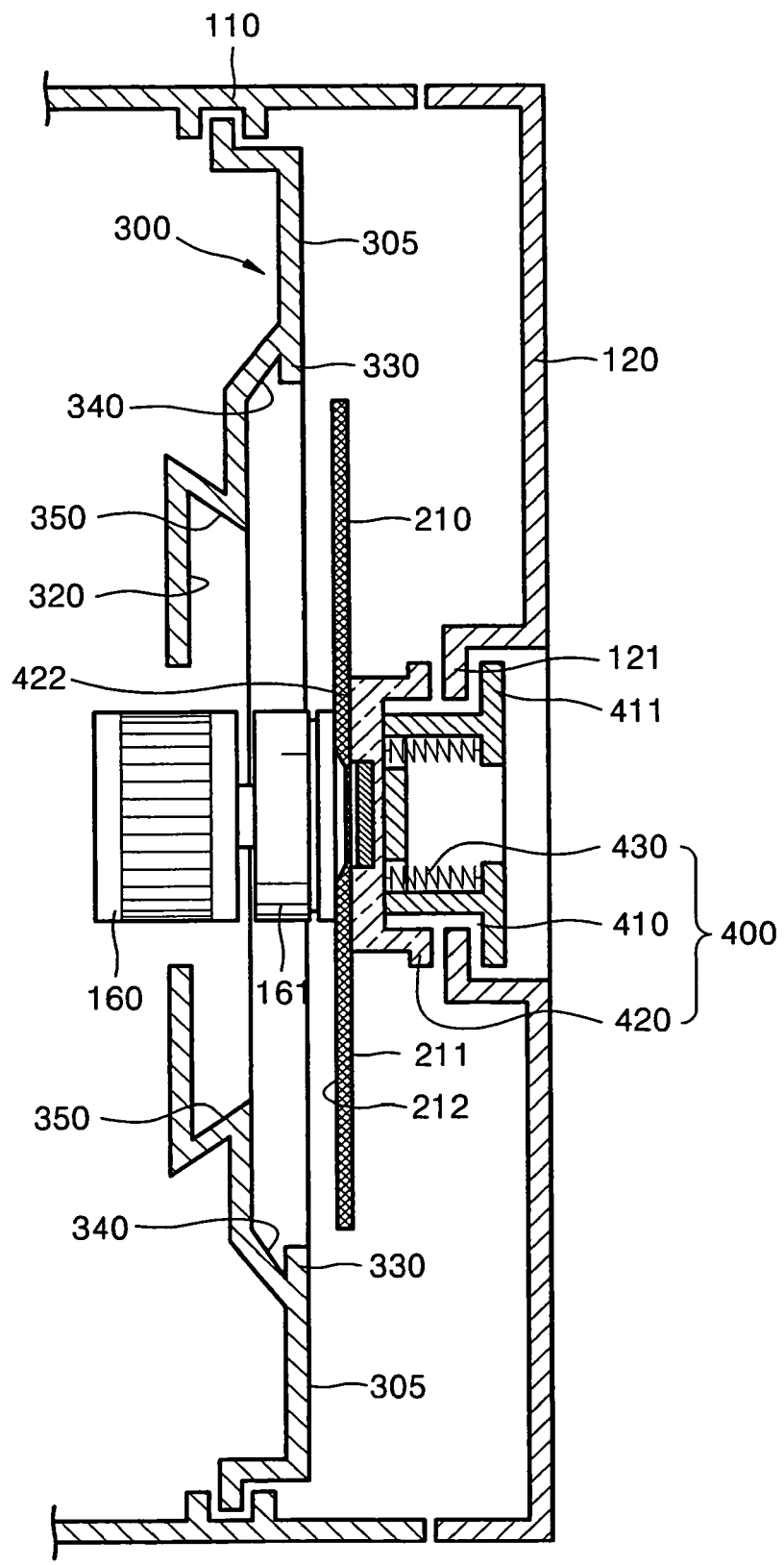

When the turntable 161 comes near the first disk 210, the elastic member 430 extends due to the magnetic force exerted between the magnet (not shown) and the iron piece 421 placed in the second member 420, and then the second member 420 approaches the first disk 210. The second member 420 comes into contact with the top surface 211 of the first disk 210 and pushes the first disk 210 toward the first loading portion 310. The first disk 210 moves along the first inclined portion 340 so that the bottom surface 211 comes into contact with the first loading portion 310 as shown in FIG. 8B. When the turntable 161 comes into contact with the bottom surface 212 of the first disk 210 and the spindle motor 160 continues to move towards the disk, the second member 420 is pushed toward the second frame 120 while in contact with the top surface 212 of the first disk 210. When the spindle motor 160 stops moving, the edge 411 of the first member 410 is slightly detached from the support 121 as shown in FIG. 8C. In this situation, the turntable 161 supports the bottom surface 212 of the first disk 210, and the second member 420 supports the top surface 211 of the first disk 210 due to the magnetic force of the magnet (not shown). When the spindle motor 160 rotates, the clamp 400 is rotated while supporting the first disk 210.

The procedure of unloading the first disk 210 is performed in the reverse order of the above-explained process. When the loading motor 170 is rotated backward, the cam member 180 moves in the direction C2 of FIG. 5. The deck 140 is moved away from the disk due to the interference between the first cam groove 181 and the shaft 142. As the spindle motor 160 moves away from the disk, the clamp 400 moves away from the disk as well. When the edge 411 of the first member 410 comes into contact with the support 121, the elastic member 430 extends to move only the second member 420. The first disk 210 comes into contact with the first loading portion 310 as shown in FIG. 8B. At the moment when the spindle motor 160 continues to move away from the disk and the elastic force of the elastic member 430 becomes larger than that of the magnet (not shown), the second member 420 is detached from the top surface 211 of the first disk 210 and then returns to the original location due to the elastic force of the elastic member 430. While the deck 140 moves towards its original position, the pinion 171 and the second rack gear 303 are detached from each other so that the tray 300 does not move. If the tray 300 is slightly pushed in the direction B2 of FIG. 5 due to the interference between the boss 183 and the second cam groove 304 as the cam member 180 moves in the direction B2 of FIG. 5, the pinion 171 and the second rack gear 303 are connected with each other. Here, the connection between the pinion 171 and the first rack gear 182 is finished and the deck 140 returns to its original position. As the loading motor 170 rotates, the tray 300 slides outwards to be unloaded in the direction B2 of FIG. 5.

The procedure of loading the second disk 220 will now be described.

Figure 9A:
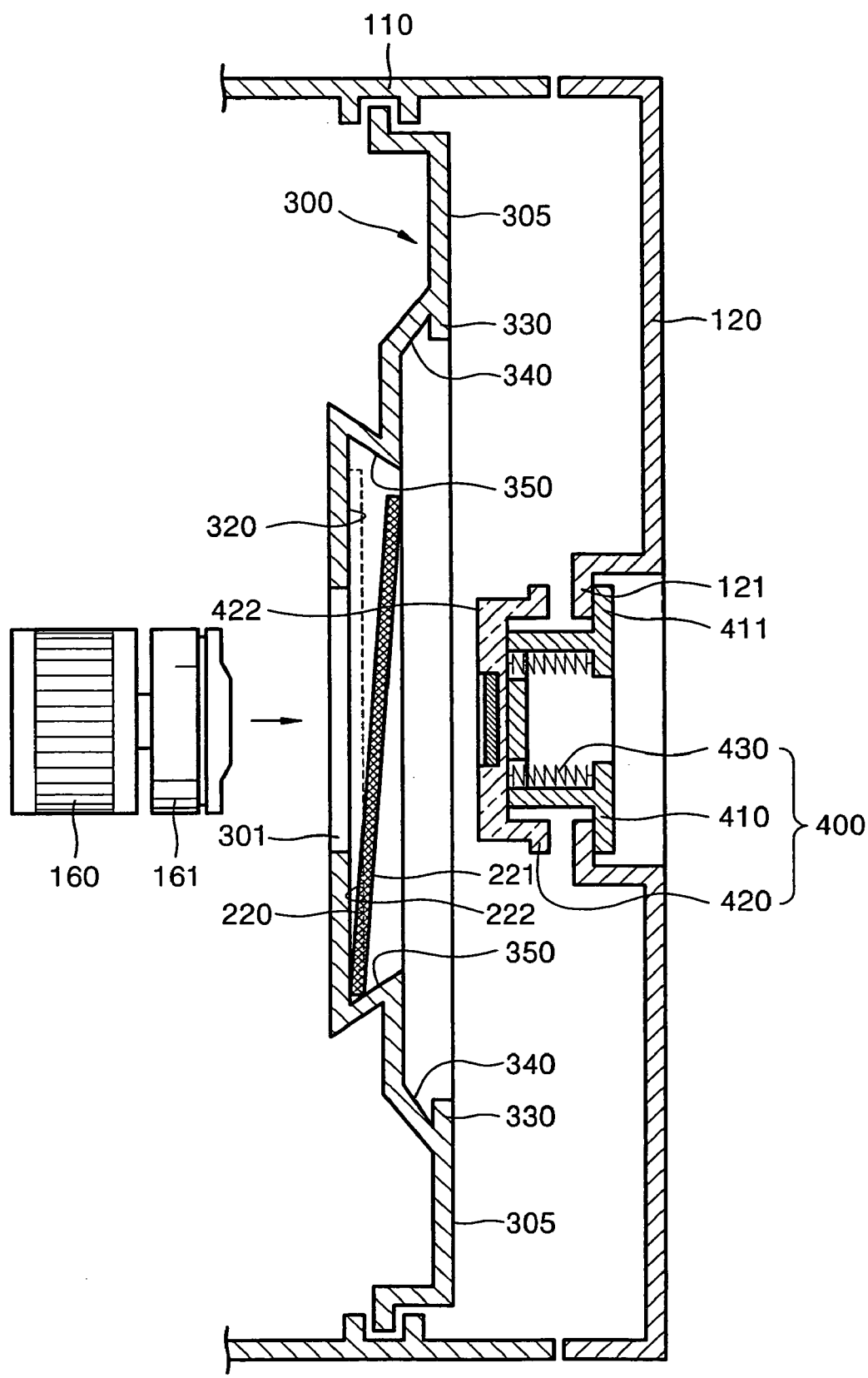
FIGS. 9A, 9B, and 9C are sectional views for explaining a loading procedure of a second disk.
Figure 9B:
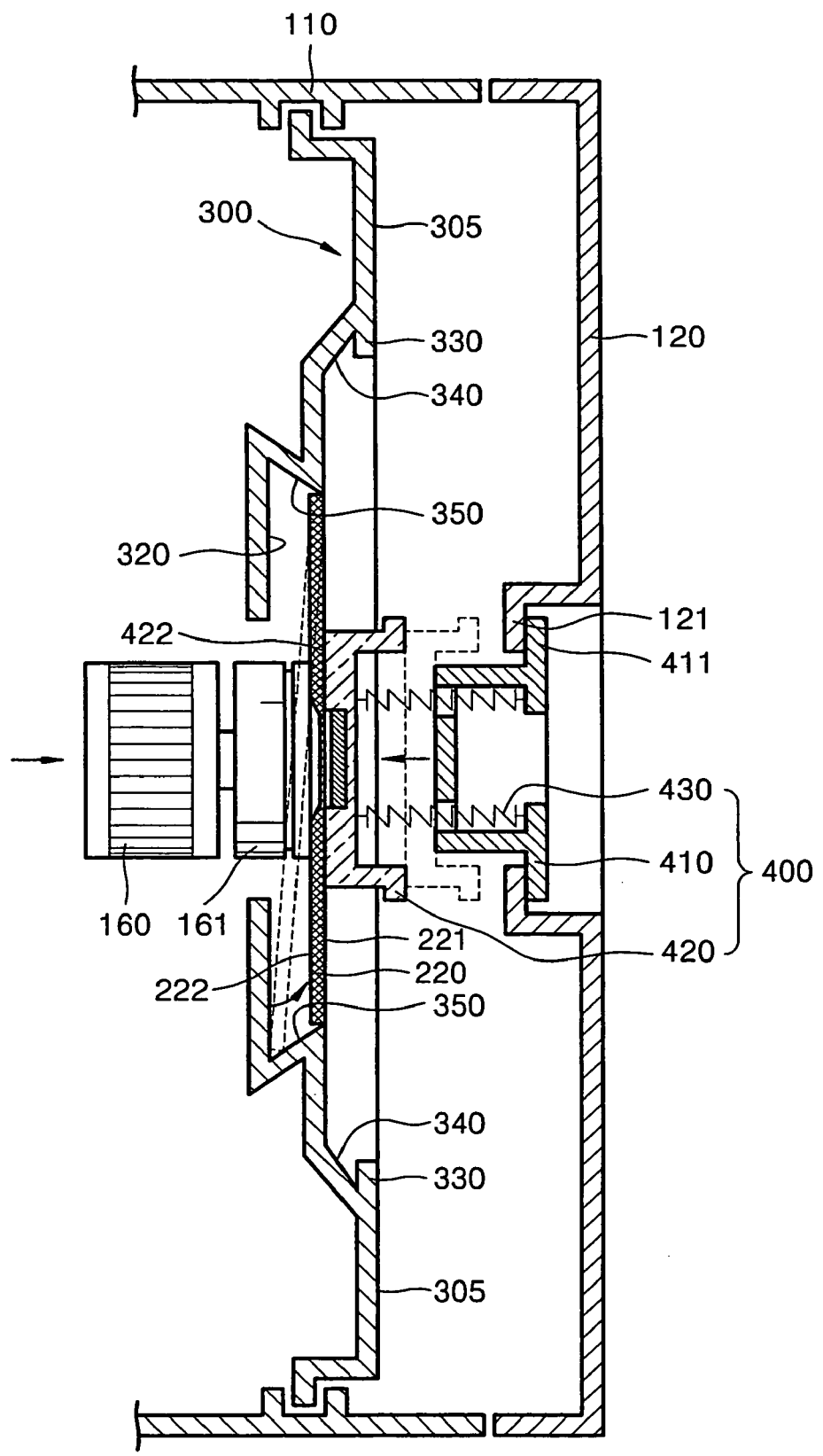

The procedure prior to the deck moving upwards is the same as the procedure of loading the first disk 210. When the optical disk drive is vertically installed, it is more likely that the second disk 220 slides down to a position indicated by solid lines from a position indicated by dashed lines as illustrated in FIG. 9A so that the second disk 220 stands obliquely and is hooked by the second inclined portion 350. As a result, the second disk 220 does not depart from the second loading portion 210 while the tray 300 is loaded, due to the second inclined portion 350. When the deck 140 starts to move, the turntable 161 approaches the bottom surface 222 of the second disk 220. As the spindle motor 160 moves towards the disk, the turntable 161 comes into contact with the bottom surface 222 of the second disk 220 so as to push the second disk 220. Then, as shown in FIG. 9B, the second disk 220 moves along the second inclined portion 350. Here, the second member 420 moves toward the disk while attracted by the magnetic force of the magnet (not shown) provided in the turntable 161. The second member 420 is moved as far as the first loading portion 310. Alternatively, the second member 420 may come into contact with the top surface 221 of the second disk 220 when the turntable 161 comes into contact with the bottom surface 222 of the second disk 220. The movement of the second member 420 can be adjusted by properly controlling the magnitude of the magnetic force of the magnet (not shown) and the elasticity of the elastic member 430.

Figure 9C:
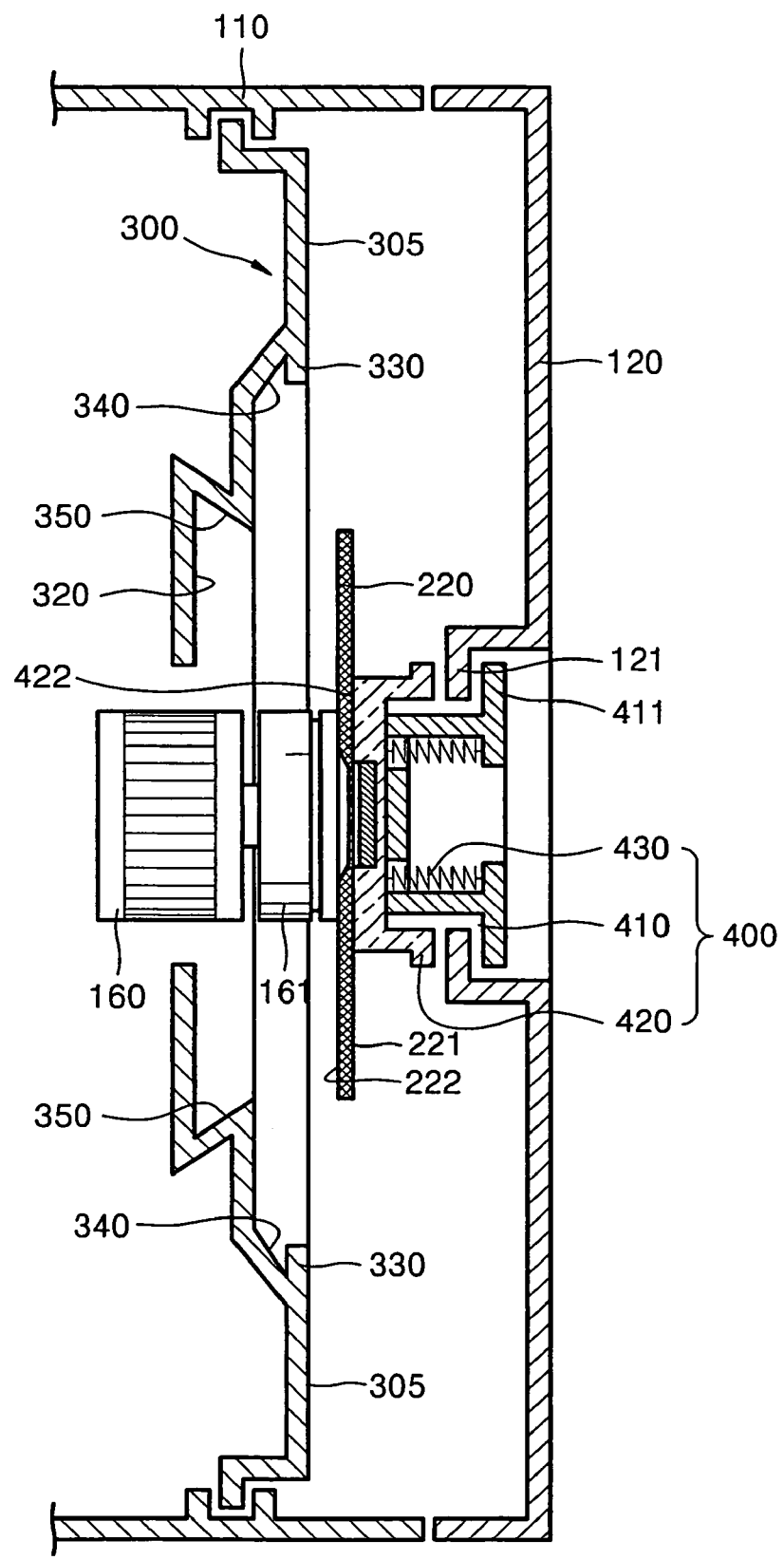

When the spindle motor 160 is completely separated from the disk, the edge 411 of the first member 410 is slightly detached from the support 121 as shown in FIG. 9C. In this situation, the turntable 161 supports the bottom surface 222 of the first disk 220, and the second member 420 supports the top surface 221 of the second disk 220 due to the magnetic force of the magnet (not shown). When the spindle motor 160 rotates, the clamp 400 is rotated while supporting the second disk 220.

The procedure of unloading the second disk 220 is carried out in the reverse order of the above-explained loading process. As the spindle motor 160 is moved away from the disk, the second member 420 moves as well so that the second disk 220 is guided to the second loading portion 320. Then, at the moment when the elasticity of the elastic force 430 becomes larger than that of the magnet (not shown), the second member 420 is detached from the top surface 221 of the second disk 220 and returns to the original position due to the elasticity of the elastic member 430.

According to the embodiment of the present invention explained above, even when the optical disk drive is vertically installed, the first and second disks 210 and 220 of different diameters may be stably loaded. An embodiment of the optical disk drive of the present invention having the clamp 400 is especially effective in loading the second disk 220 while the drive is vertically installed.

In the conventional optical disk drive shown in FIG. 1, the clamp 41 cannot support the top surface 62 of the disk 60 when the turntable 34 pushes the disk 60 upwards, thereby causing a loading error since the disk 60 may be separated from the turntable 34 as mentioned before.

In an embodiment of the present invention, the second member 420 supports the top surface 221 of the second disk 220 so that the second disk 220 does not separate from the turntable 161 while the turntable 161 is moved to come into contact with the bottom surface 222 of the second disk 220. Therefore, even in case of vertical installation of the optical disk drive, the second disk 220 may be stably loaded.

During loading, the first disk 210 moves along the first inclined portion 340 while being pushed by the turntable 161, and the second disk 220 moves along the second inclined portion 350 while being pushed by the second member 420. This minimizes the deviation between the turntable 161 and a clamping hole 201 of the first disk 210 or the second disk 220, and accordingly allows more stable loading of the first or second disk 210 or 220.

The above embodiment is explained with a configuration where the magnet is provided in the turntable 161 and the iron piece in the clamp 400. However, the scope of the present invention is not confined to the above. Conversely to the above embodiment, it is possible that the magnet is provided in the clamp 400, and the iron piece is provided in the turntable 161 or the turntable is made of a material attracting the magnet. In another case, magnets of different polarities may be provided respectively in the turntable 161 and the clamp 400.

As described above, the embodiments of the present invention are configured in such a manner that one plane of a disk is supported by a clamp on the opposite side of a turntable to thereby enable stable loading/unloading the disk. Furthermore, in case of the vertical installation of the optical disk drive, such a small disk as 80 mm in diameter can be stably loaded/unloaded including a usually used 120 mm disk. The first and second inclined portions minimize the deviation between the turntable and the clamp hole of the first or second disk, and thereby enable it to be loaded more stably.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical disk drive comprising:
   a tray including first and second loading portions respectively loading a first disk and a second disk of a smaller diameter than the first disk, the first and second loading portions having different heights, a first inclined portions formed obliquely outward on an edge of the first loading portion and a second inclined portion formed obliquely inward with respect to edges of the first and second loading portions, and a separation preventing portion extending over the first loading portion to prevent the first disk from separating from the first loading portion;
   a spindle motor having a turntable supporting the disks on one plane of the disks and rotating the disks, said spindle motor approaching/separating from the disks; and
   a clamp rotatably supporting the disks on the other plane of the disks, wherein the clamp approaches the disks due to a magnetic force exerted between the clamp and the turntable as the spindle motor approaches the disks.

2. The optical disk drive as claimed in claim 1, wherein the clamp comprises:
   a first member;
   a second member installed in the first member and approaching the disks due to the magnetic force exerted between the clamp and the turntable; and
   an elastic member for elastically biasing the first member in a direction in which the second member is detached from the disk.

3. The optical disk drive as claimed in claim 1, wherein the first and second disks have diameters of 120 mm and 80 mm, respectively.

4. The optical disk drive as claimed in claim 1, wherein the turntable is formed wholly or partly of a magnetic material.

5. The optical disk drive as claimed in claim 1, further comprising a magnet located on the turntable and an iron piece located on the clamp.

6. The optical disk drive as claimed in claim 1, further comprising a magnet located on the clamp and an iron piece located on the turntable.

7. The optical disk drive as claimed in claim 1, wherein magnets of different polarities provided on the turntable and the clamp.

8. The optical disk drive as claimed in claim 2, wherein the second member is configured to support a top surface of the disks, while facing the turntable.

9. The optical disk drive as claimed in claim 1, wherein the disk drive further includes an optical pickup.

10. The optical disk drive as claimed in claim 9, wherein a hollow window is formed on the tray allowing the optical pickup to access the disk.

11. The optical disk drive as claimed in claim 1, wherein the separation preventing portion is placed at various locations of the first loading portion.

12. The optical disk drive as claimed in claim 1, further including a first frame and a second frame facing the first frame.

13. The optical disk drive as claimed in claim 12, wherein the tray is slidably installed in the first frame.

14. The optical disk drive as claimed in claim 1, wherein the first inclined portion extends from the first loading portion to a top surface of the tray.

15. The optical disk drive as claimed in claim 1, wherein the second inclined portion extends from the second loading portion to the first loading portion.

* * * * *

UNITED STATES PATENT AND TRADEMARK OFFICE
CERTIFICATE OF CORRECTION

| | |
|---|---|
| PATENT NO. | : 7,246,362 B2 |
| APPLICATION NO. | : 10/872544 |
| DATED | : July 17, 2007 |
| INVENTOR(S) | : Tae-gon Han |

Page 1 of 1

It is certified that error appears in the above-identified patent and that said Letters Patent is hereby corrected as shown below:

Column 7, Line 30-31, change "portions" to --portion--.

Signed and Sealed this

Eighteenth Day of December, 2007

JON W. DUDAS
*Director of the United States Patent and Trademark Office*